United States Patent
Wall

(10) Patent No.: US 9,682,667 B2
(45) Date of Patent: Jun. 20, 2017

(54) TRAILER SUSPENSION INCLUDING TUBES AND WIRES SUPPORT SYSTEM

(71) Applicant: Reyco Granning, LLC, Mount Vernon, MO (US)

(72) Inventor: Kenneth Wall, Springfield, MO (US)

(73) Assignee: Reyco Granning, LLC, Mount Vernon, MO (US)

( * ) Notice: Subject to any disclaimer, the term of this patent is extended or adjusted under 35 U.S.C. 154(b) by 0 days.

(21) Appl. No.: 14/948,531

(22) Filed: Nov. 23, 2015

(65) Prior Publication Data

US 2017/0144616 A1    May 25, 2017

(51) Int. Cl.
*B60R 16/02* (2006.01)
*B62D 21/20* (2006.01)

(52) U.S. Cl.
CPC ...... *B60R 16/0222* (2013.01); *B60R 16/0215* (2013.01); *B62D 21/20* (2013.01)

(58) Field of Classification Search
CPC .. B60R 16/0222; B60R 16/0215; B62D 21/20
USPC ...................................................... 280/422
See application file for complete search history.

(56) References Cited

U.S. PATENT DOCUMENTS

| | | | |
|---|---|---|---|
| 2,835,504 A | 5/1958 | Acker | |
| 3,851,672 A | 12/1974 | De Vincent et al. | |
| 4,993,737 A | 2/1991 | Torcomian | |
| 5,088,763 A * | 2/1992 | Galazin | B60G 9/04 280/124.109 |
| D333,421 S | 2/1993 | Patti | |
| 5,232,234 A | 8/1993 | McCombs | |
| 5,346,233 A | 9/1994 | Moser | |
| 5,451,069 A | 9/1995 | Schueman | |
| 5,531,467 A | 7/1996 | Schueman | |
| 5,564,725 A | 10/1996 | Brazeal | |
| 5,716,071 A * | 2/1998 | Stanley | B62D 53/068 280/149.2 |
| 5,720,489 A * | 2/1998 | Pierce | B62D 53/068 280/149.2 |
| 6,213,489 B1 | 4/2001 | Eckelberry | |
| 6,244,608 B1 * | 6/2001 | Hess | B62D 53/068 14/69.5 |
| 7,126,458 B2 * | 10/2006 | Trudeau | B60G 9/00 303/191 |
| 7,163,220 B2 | 1/2007 | Pappas | |

(Continued)

*Primary Examiner* — Kevin Hurley
*Assistant Examiner* — Michael Stabley
(74) *Attorney, Agent, or Firm* — George Pappas

(57) ABSTRACT

A trailer slider suspension including a tubes and wires support system. The slider includes a frame slidably coupled to and supporting a trailer. The frame includes a cross brace including a pair of overlapping straps to resist twisting. A rotatable shaft is coupled to pins on the frame which are thereby selectively retractable and extendable into the trailer whereby the frame can be moved and fixed along the trailer. Supporting brackets are provided including a central portion and left and right arms extending therefrom. A shaft hole is provided in the central portion and straps openings are provided in each of the arms. The bracket is secured to the frame at a distance from the straps overlap with the rotatable shaft extending through the shaft hole, one of the straps extending through the left arm strap opening and the other strap extending through the right arm strap opening.

20 Claims, 8 Drawing Sheets

(56) References Cited

U.S. PATENT DOCUMENTS

| | | | |
|---|---|---|---|
| 7,198,298 B2 * | 4/2007 | Ramsey | B62D 53/068 |
| | | | 280/793 |
| 7,261,177 B2 | 8/2007 | Eckelberry | |
| 8,025,302 B2 * | 9/2011 | Saieg | B62D 53/0814 |
| | | | 180/209 |
| 8,360,371 B2 | 1/2013 | Getts | |
| 8,960,694 B2 * | 2/2015 | Aalderink | B60G 7/02 |
| | | | 280/124.109 |
| 2005/0051991 A1 * | 3/2005 | Saxon | B62D 21/14 |
| | | | 280/149.2 |

* cited by examiner

TRAILER SUSPENSION INCLUDING TUBES AND WIRES SUPPORT SYSTEM

BACKGROUND OF THE INVENTION

1. Field of the Invention

The present invention relates to the field of trailer suspensions. More particularly, the present invention relates to slider trailer suspensions including a system for supporting air tubes and electrical conductor wires.

2. Background

Slider suspensions also known as "sliders" are today commonly used on trailers whereby the axles thereof can be longitudinally adjusted and then pinned to the trailer chassis relative to the load carried by the trailer. An exemplary slider is, for example, shown and described in U.S. Pat. No. 7,163,220. Such sliders include various air operated components including air brakes and suspension air springs, as well as electrical control sensors, etc. Hence air tubes and electrical wires must be strung through the slider frame to the various slider components and, if perhaps needed, also through the slider frame to lights and components at other locations of the trailer.

The tubes and wires are typically strung through holes in the frame beams and/or are are otherwise secured to the slider frame, for example, as shown in U.S. Pat. No. 2,835,504 and U.S. Pat. No. 7,261,177. However, the prior means of securing the tubes and wires to the frame require that the tubes and wires follow the paths of the beam holes which may not be efficient and desirable, and the securements to the frame can over time become unreliable.

Accordingly, a system is needed for effectively and relatively inexpensively supporting tubes and wires extending through a slider suspension system along a desired or needed path regardless of the locations of the frame beams and the holes thereof.

SUMMARY OF THE INVENTION

The present invention addresses and overcomes the shortcomings of prior slider suspensions.

In one form thereof the present invention is directed to a trailer suspension including a tubes and wires support system. The suspension includes a frame adapted to support a trailer and an axle secured to the frame. Elongate cross brace straps are secured to the frame and form a cross brace having a cross brace center. A shaft is mounted on the frame at a distance from the cross brace. A tubes and wires supporting bracket is provided having a pair of straps openings and a shaft hole. The supporting bracket is secured to the frame at a distance from the cross brace straps center with one of the straps extending through one of the bracket openings, the other one of the straps extending though the other one of the bracket openings, and with the shaft extending through the bracket hole. The tubes and wires extending along the frame are supported by the bracket.

Preferably, the supporting bracket includes one or more supporting holes wherethrough the tubes and wires are received and are thereby supported. Annular grommets are provided circumscribing the bracket supporting holes wherethrough the tubes and wires are received and are thereby supported.

The supporting bracket includes a central portion and left and right arms extending in opposite directions with the hole being located at the central portion, one of the openings being located in the left arm, the other of the openings being located in the right arm, and the supporting holes being provided through one of the left or right arms.

The openings are preferably located in a first plane distant from the shaft hole, and the shaft hole and both the openings are located in a second plane which is perpendicular to the first plane.

Yet more preferably, the frame is slidably coupled to a trailer chassis and is selectively longitudinally slidable along the chassis, and the frame includes a plurality of pins coupled to the shaft whereby the shaft is selectively rotatable and the pins are selectively retracted for sliding the frame along the chassis and extended for fixing the frame to the chassis.

The cross brace straps are preferably rectangular shaped in cross section and the bracket openings are rectangular shaped and sized to tightly fit around a strap. The shaft is preferably rod shaped and the bracket shaft hole is cylindrical shaped and sized to tightly fit around but not interfere with rotation of the shaft.

In another form thereof, the invention is directed to a trailer suspension including a tubes and wires support system. The suspension includes a frame adapted to support a trailer and an axle secured to the frame. An elongate brace strap is secured to the frame and a shaft is mounted on the frame at a distance from the brace. A tubes and wires supporting bracket is provided having a strap opening and a shaft hole. The supporting bracket is secured to the frame with the strap extending through the bracket opening and with the shaft extending through the bracket shaft hole. A supporting hole extends through the bracket wherethrough the tubes and wires are received and are thereby supported.

Preferably, the cross brace strap is rectangular shaped in cross section and the bracket opening is rectangular shaped and sized to tightly fit around the strap, and the shaft is rod shaped and the bracket shaft hole is cylindrical shaped and sized to tightly fit around but not interfere with rotation of the shaft.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Figure 1:
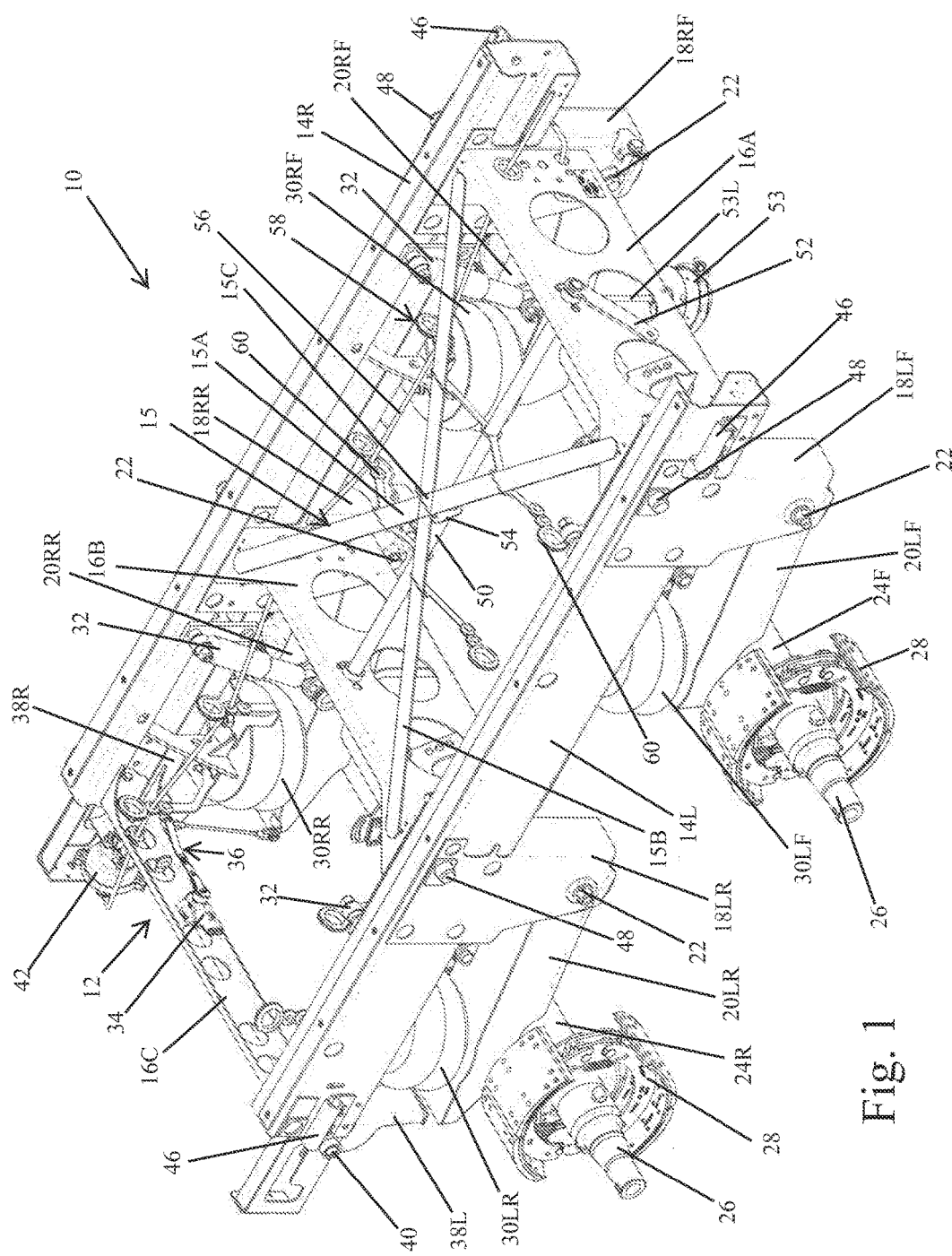
FIG. 1 is a perspective view of a slider suspension including a tubes and wires support system constructed in accordance with the principles of the present invention.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

A slider constructed in accordance with the principles of the present invention is shown in FIG. 1 and is designated by the numeral 10. Slider 10 includes a frame 12 including left and right side longitudinal C-shaped rails 14L, 14R and cross beams 16A, 16B, 16C secured to and extending perpendicularly between the side rails 14L, 14R. A cross brace 15 is provided for resisting twisting of the frame 12. Cross brace 15 comprises straps 15A and 15B which cross/overlap at about their center 15C and form an "X". The cross brace 15, hence, extends along a horizontal plane. Strap 15A extends between and is secured to the terminal end of cross beam 16A adjacent side rail 14L and to the terminal end of cross beam 16B adjacent side rail 14R. Strap 15B extends between and is secured to the terminal end of cross beam 16A adjacent side rail 14R and to the terminal end of cross beam 16B adjacent side rail 14L. Straps 15A, 15B function in tension and so are typically made of relatively thin steel of about 0.179 inch thick and 0.50 to 2.0 inches wide.

Left front and rear hangers 18LF, 18LR are secured to and extend vertically below the left side rail 14L, and right front and rear hangers 18RF, 18RR are secured to and extend vertically below the right side rail 14R. A left front trailing beam 20LF is pivotally secured to the lower terminal end of left front hanger 18LF with a pivot bushing assembly 22; a left rear trailing beam 20LR is pivotally secured to the lower terminal end of left rear hanger 18LR with a pivot bushing assembly 22; a right front trailing beam 20RF is pivotally secured to the lower terminal end of right front hanger 18RF with a pivot bushing assembly 22; and, a right rear trailing beam 20RR is pivotally secured to the lower terminal end of right rear hanger 18RR with a pivot bushing assembly 22.

A front axle 24F extends between and is secured to each of the left front trailing beam 20LF and the right front trailing beam 20RF. A rear axle 24R extends between and is secured to each of the left rear trailing beam 20LR and the right rear trailing beam 20RR. The terminal ends of the axles 24F, 24R are provided with spindles 26, in a known and customary manner, which are adapted to rotatably carry wheels (not shown). The terminal ends of axles 24F, 24R are also provided with brake assemblies 28, in a known and customary manner, which are adapted to be actuated with air activated spring brake chambers (not shown) in the rotatable wheels.

A left front air spring 30LF is provided between and is secured to the left front trailing beam 20LF and the left side rail 14L; a left rear air spring 30LR is provided between and is secured to the left rear trailing beam 20LR and the left side rail 14L; a right front air spring 30RF is provided between and is secured to the right front trailing beam 20RF and the right side rail 14R; and, a right rear air spring 30RR is provided between and is secured to the right rear trailing beam 20RR and the right side rail 14R. A shock absorber/dampener 32 is pivotally secured between each of the left front and left rear trailing beams 20LF, 20LR and the left side rail 14L. A shock absorber/dampener 32 is also pivotally secured between each of the right front and right rear trailing beams 20RF, 20RR and the right side rail 14R. As should now be appreciated, the axles 24F, 24R are pivotally moveable vertically about pivot bushing assemblies 22, and the load from the axles 24F, 24R is transferred to the frame 12 through the air spring 30LF, 30LR, 30RF, 30RR which are in compression.

Pressurized air is provided to each of the air springs 30LF, 30LR, 30RF, 30RR from an air pressure source (not shown) through a height control valve 34. Height control valve 34 is mounted on cross beam 16C of the frame 12 and is coupled to trailing beam 20RR with a linkage 36 whereby the distance between trailing beam 20RR and the frame 12 is monitored and is used for pressurizing the air springs 30LF, 30LR, 30RF, 30RR as needed for provided a desired spring rate and for adjusting the height of frame 12 relative to the axles 24F, 24R.

Figure 2:
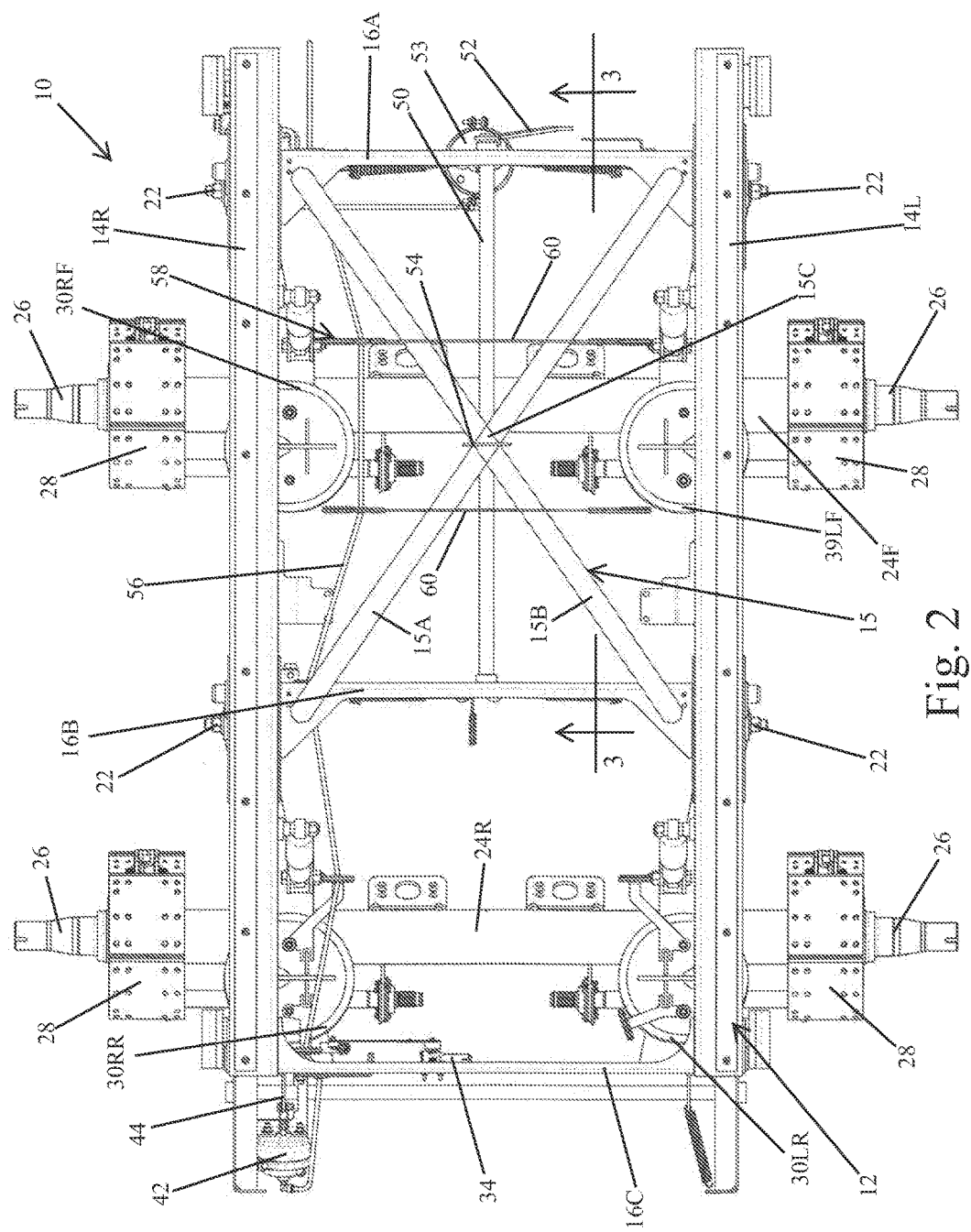
FIG. 2 is a top elevation view of the slider suspension and tubes and wires support system shown in FIG. 1.
Figure 3:
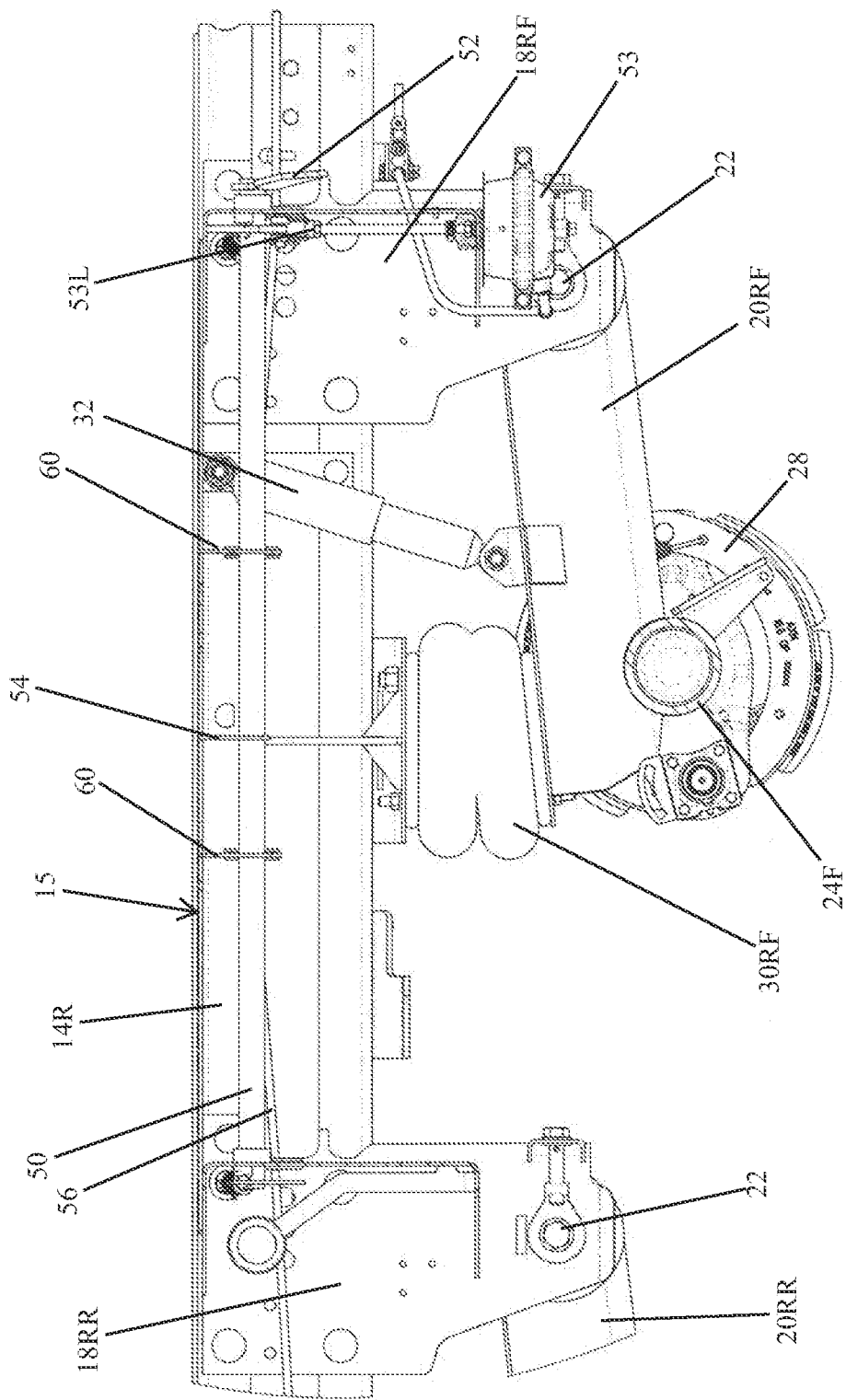
FIG. 3 is a cross sectional view of a portion of the slider suspension and the tubes and wires support system taken along line 3-3 of FIG. 2.

The height of the frame 12 can be selectively fixed with a pair of blocking arms 38L, 38R which are secured to a shaft 40. Shaft 40 is rotatably mounted on the frame 12. An air spring chamber 42 is mounted on the frame 12 and is coupled to the shaft 40 with a link 44 for thereby selectively simultaneously pivoting blocking arms 38L, 38R between a vertical extended position as shown in FIGS. 1 and 2 and a horizontal retracted position (not shown). In their vertical extended positions, arms 38L, 38R extend between the frame 12 and the respective trailing beams 20LR, 20RR for thereby blocking and limiting the vertical distance between the trailing beams and the frame 12. The height of frame 12 relative to the axles 24F, 24R can thereby be limited/fixed as needed or desired, for example, during loading and unloading.

The slider frame 12 is slidably coupled to a trailer chassis (not shown), in a known and customary manner, with slider rail guides 46 which are secured to the frame left and right side rails 14L. 14R and which are adapted to slidingly receive longitudinally extending lips extending along the trailer chassis. The slider 10 is thereby selectively slidable/adjustable longitudinally along the trailer chassis for selectively locating the slider 10 at a desired longitudinal position along the trailer chassis relative to the distribution of the load being carried by the trailer.

Slider frame 12 is selectively fixed longitudinally along the trailer chassis with locking pins 48 mounted on the frame left and right side rails 14L, 14R and which are selectively retracted from and extended into corresponding holes (not shown) in the trailer chassis. Pins 48 are selectively retracted and extended with a linkage system coupled to a rotatable shaft 50 which is selectively rotated with a crank handle (not shown) coupled to the shaft arm 52. Alternatively, an air spring chamber 53 is mounted to the frame 12 and is coupled to the shaft 50 with a linkage 53L for thereby selectively rotating the shaft 50 and automatically retracting and extending pins 48. An exemplary slider and a pins locking/releasing system is shown in U.S. Pat. No. 7,163,220, the disclosure of which is incorporated herein by reference.

A coupling plate 54 is provided at the cross brace strap centers 15C and includes holes for receiving the shaft 50 and the cross brace straps 15A, 15B therethough. Coupling plate 54 functions to stabilize and decrease vibrations of the shaft 50 and the cross brace straps 15A, 15B.

A plurality of tubes and wires extend through the slider 10 for providing air and/or electrical power, in a known and customary manner, to the various slider and trailer components such as, for example, the spring brake chambers, the suspension air springs 30LF, 30LR, 30RF, 30RR, the blocking arms air spring chamber 42, the trailer lights, electrical control sensors, etc. The tubes can be made of steel, aluminum, plastic, rubber, etc., and typically carry pressurized air, although they may also carry hydraulic oil and/or other pressurized fluids. The wires are typically insulated electrical conductor wires. Exemplary tubes and wires are shown and designated in the drawings with the numeral 56.

In accordance with the principles of the present invention, a tubes and wires supporting system 58 is provided for supporting the plurality of tubes and wires 56 as they extend through the slider 10. The supporting system 58 includes tubes and wires supporting brackets 60 which are secured to the slider 10 and include one or more supporting holes 62 wherethrough the tubes and wires are received and are thereby supported. Supporting brackets 60 are preferably made of steel stock of about 0.179 inch thick by stamping or cutting and bending to the desired shapes. Plastic or rubber annular shaped grommets 64 are received in and circumscribe the brackets supporting holes 62 for decreasing potential wear and/or damage to the tubes and wires 56 extending therethrough.

Figure 6:
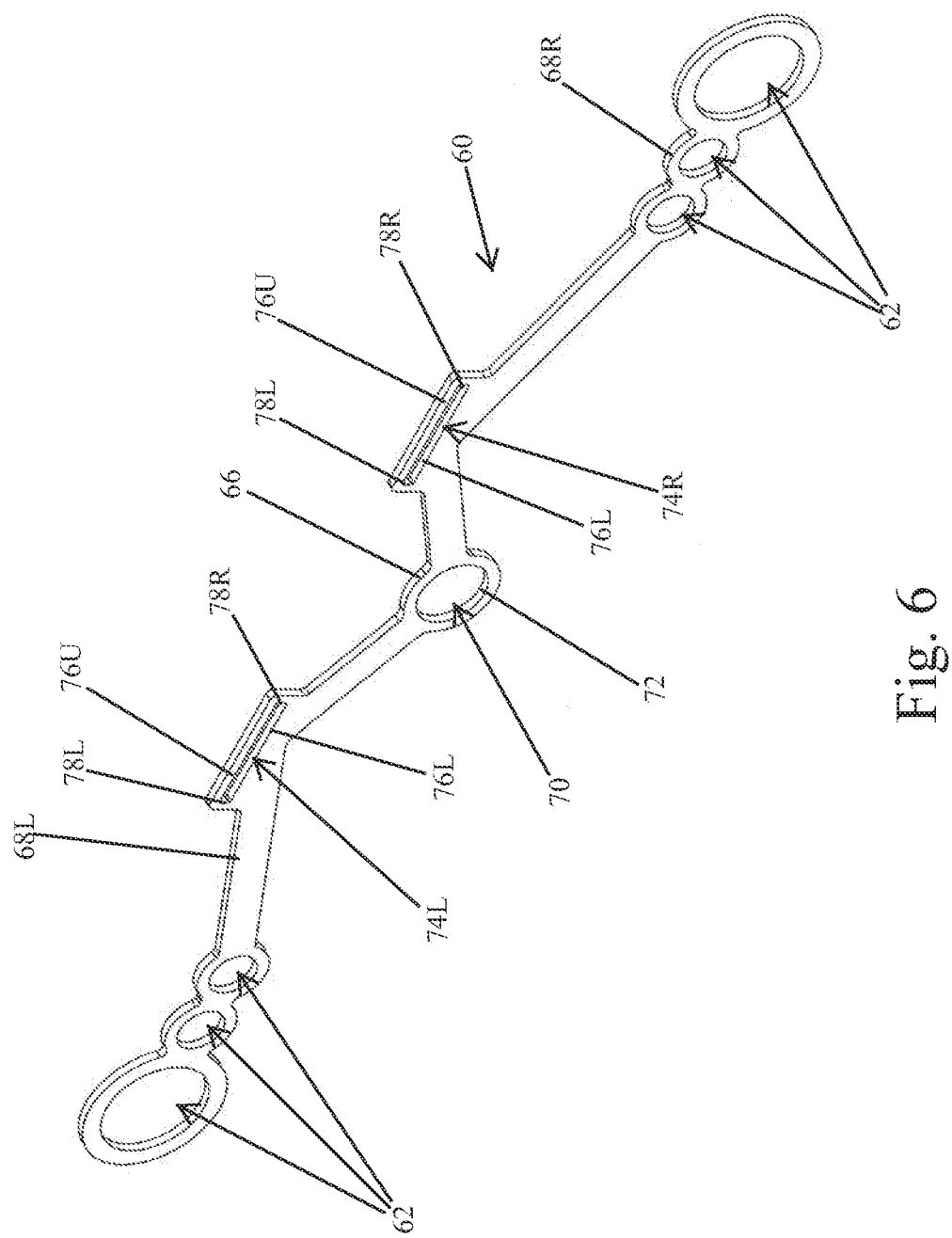
FIG. 6 is a perspective view of the supporting brackets shown in FIGS. 1-5.

Advantageously, the tubes and wires supporting brackets 60 are secured to the slider cross brace 15 and the rotatable shaft 50. As best seen in FIG. 6, supporting brackets 60 include a central portion 66 and a pair of left and right arms 68L, 68R extending therefrom in opposite directions. A shaft receiving hole/bore 70 is defined by a cylindrical shaped wall 72 and is provided centrally through the portion 66. Hole 70 is sized and adapted to receive the rod shaped rotatable shaft 50 therethough. The diameter/width of hole 70 is slightly larger than the diameter/width of the shaft 50 whereby the wall 72 thereof fits tightly therearound but does not interfere with the rotation thereof.

The left and right arms 68L, 68R are mirror images of one another and are provided with respective rectangular shaped openings 74L, 74R. Rectangular openings 74L, 74R are each defined by elongate upper and lower walls 76U, 76L and left and right vertical walls 78L, 78R. Rectangular openings 74L, 74R are sized and adapted to tightly receive a cross brace strap 15A, 15B therethrough which is also rectangular shaped in cross section as shown. The rectangular openings 74L, 74R are both located in a horizontal plane which is distant from the hole 70, and both rectangular openings 74L, 74R and the hole 70 are located in a common vertical plane which is perpendicular to the horizontal plane.

Figure 4:
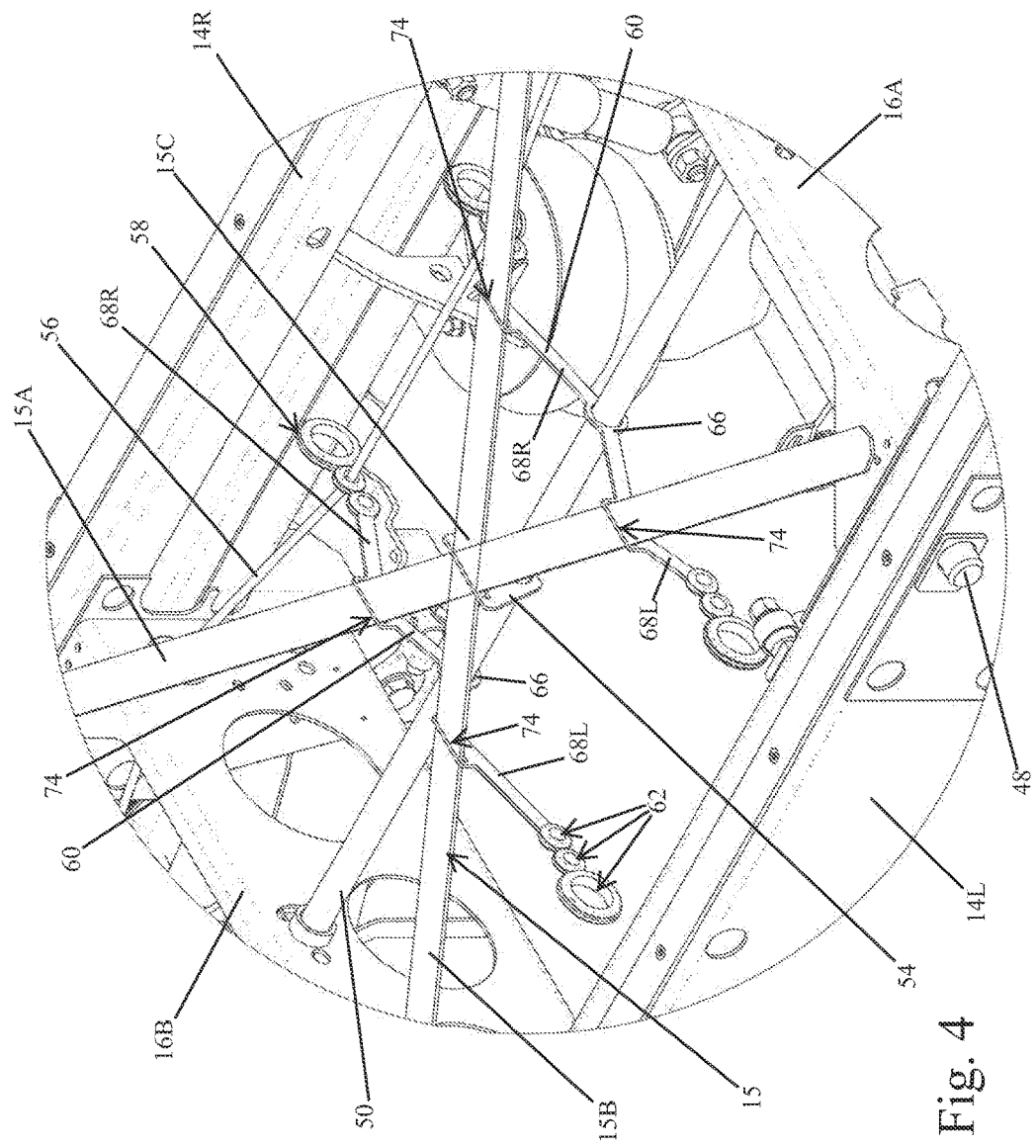
FIG. 4 is an expanded perspective view of a portion of the slider suspension and the tubes and wires support system shown in FIG. 1.
Figure 5:
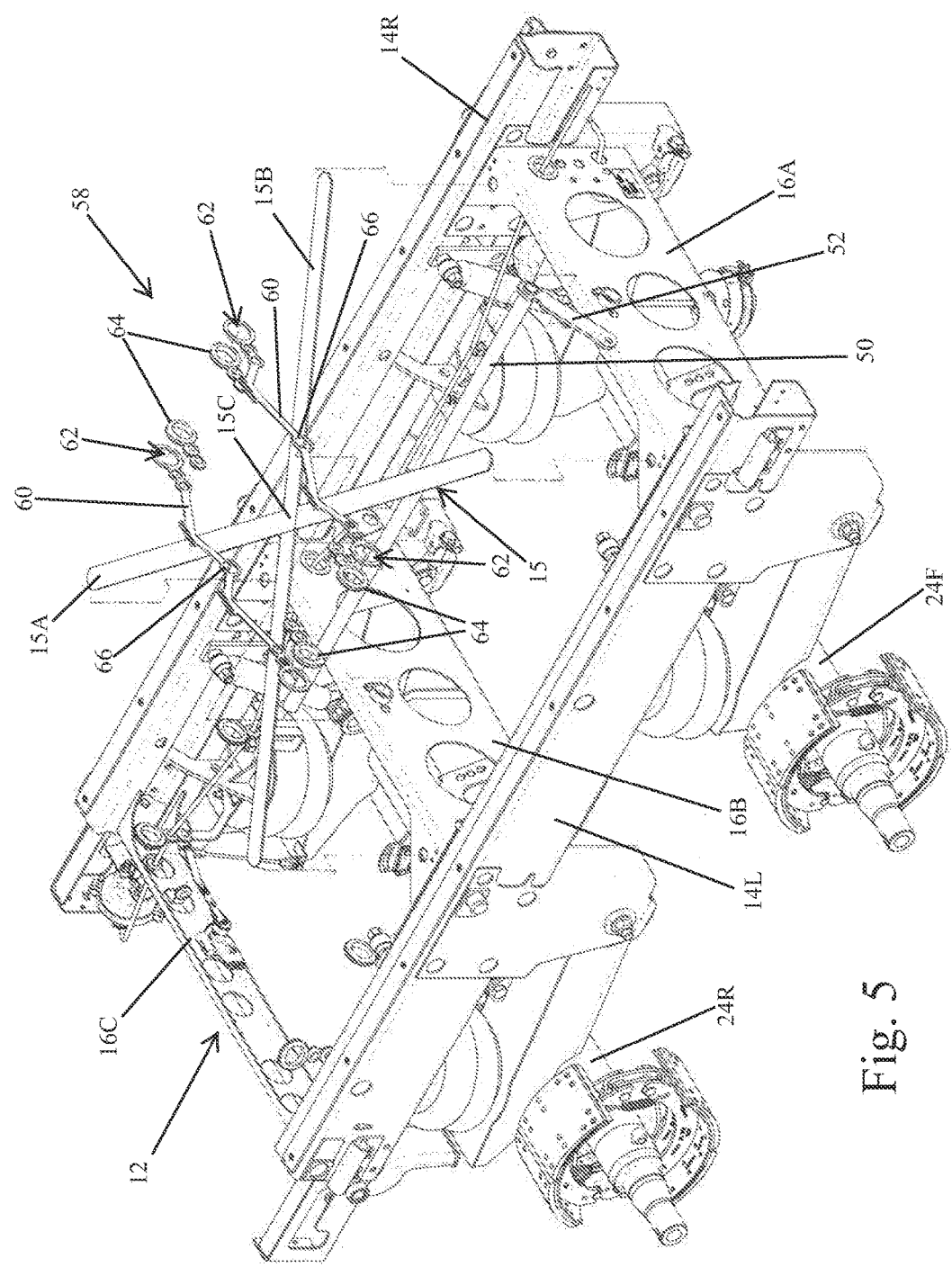
FIG. 5 is an exploded perspective view of the supporting brackets and the frame cross brace and rotatable shaft upon which the brackets are mounted as shown in FIG. 4.

As best seen in FIG. 4, the supporting brackets 60 are secured to the slider 10 by extending the rotatable shaft 50 through the shaft receiving hole 70, one of the cross brace straps 15A, 15B through one of the left or right rectangular openings 74L, 74R, and the other cross brace strap 15A, 15B through the other left or right opening 74L, 74R. The bracket is spaced from the cross brace center 15C whereat the horizontal distance between the rectangular openings 74L, 74R corresponds with the horizontal distance between the cross brace straps 15A, 15B. Also at this distance from the cross brace center 15C, the distance from each of the rectangular openings 74L, 74R to the shaft receiving hole 70 corresponds with the distance between the cross brace straps 15A, 15B and the rotatable shaft 50. Accordingly, the brackets 60 remain fixed and secure in the slider 10 in a vertical plane which is at a distance from the cross brace center 15C and perpendicular to rotatable shaft 50.

Three supporting holes 62 are provided at the terminal ends of arms 68L, 68R. In accordance with the principles of the present invention, however, supporting holes 62 can be provided anywhere along the length of the arms 68L, 68R as needed or desired. Also, the extension direction (such as by bending) and length of the arms 68L, 68R outboard of the rectangular openings 74L, 74R can be varied for thereby locating the brackets supporting holes 62 in a plane generally perpendicular to the direction of the tubes and wires 56 and at a desired location for receiving therethrough and supporting the tubes and wires 56 along a desirable path and as may be needed.

Figure 7:
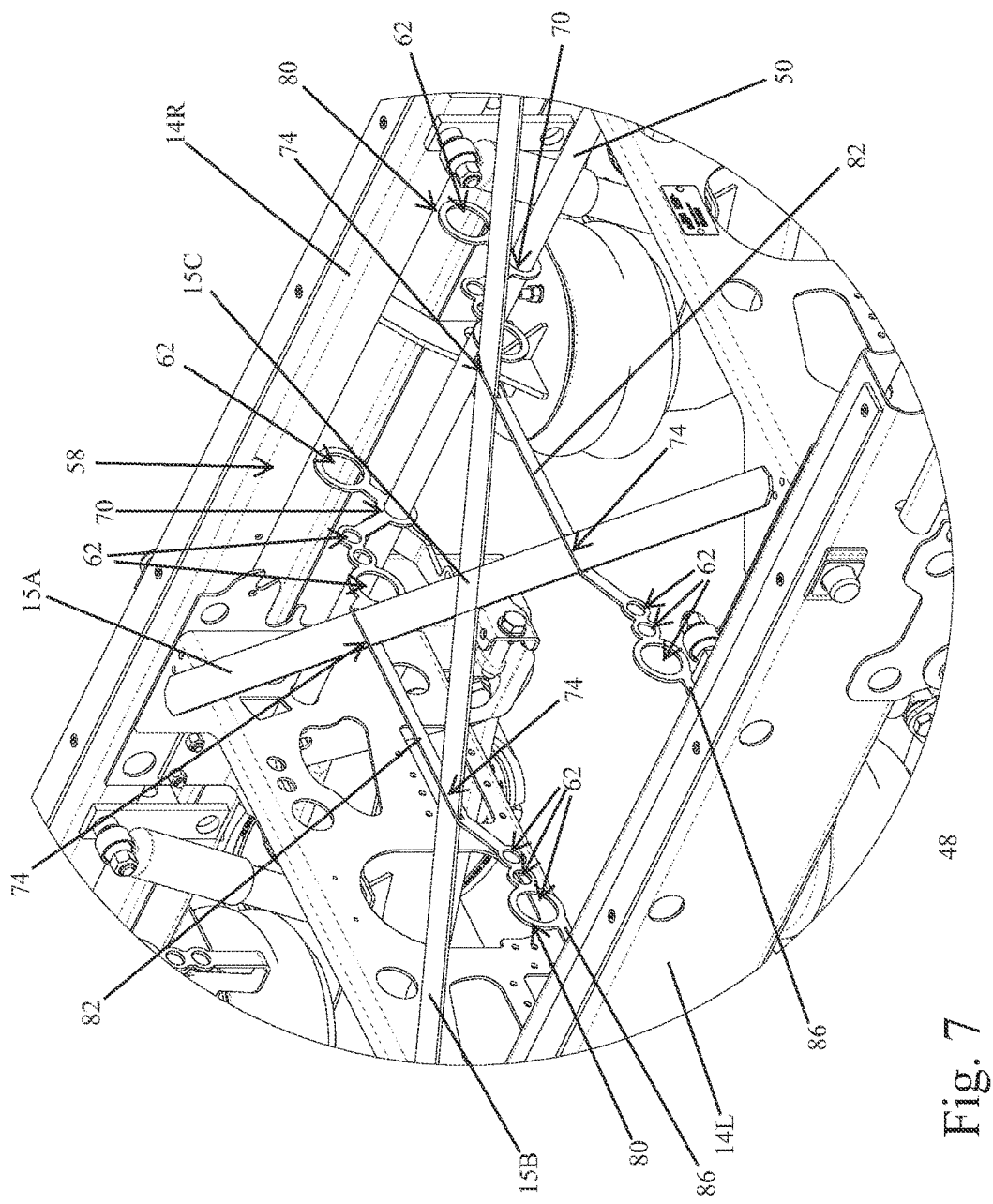
FIG. 7 is a perspective view similar to FIG. 4 and depicting another supporting bracket embodiment of the tubes and wires support system constructed in accordance with the principles of the present invention; and, FIG. 8 is a perspective view of the supporting brackets shown in FIG. 7.
Figure 8:
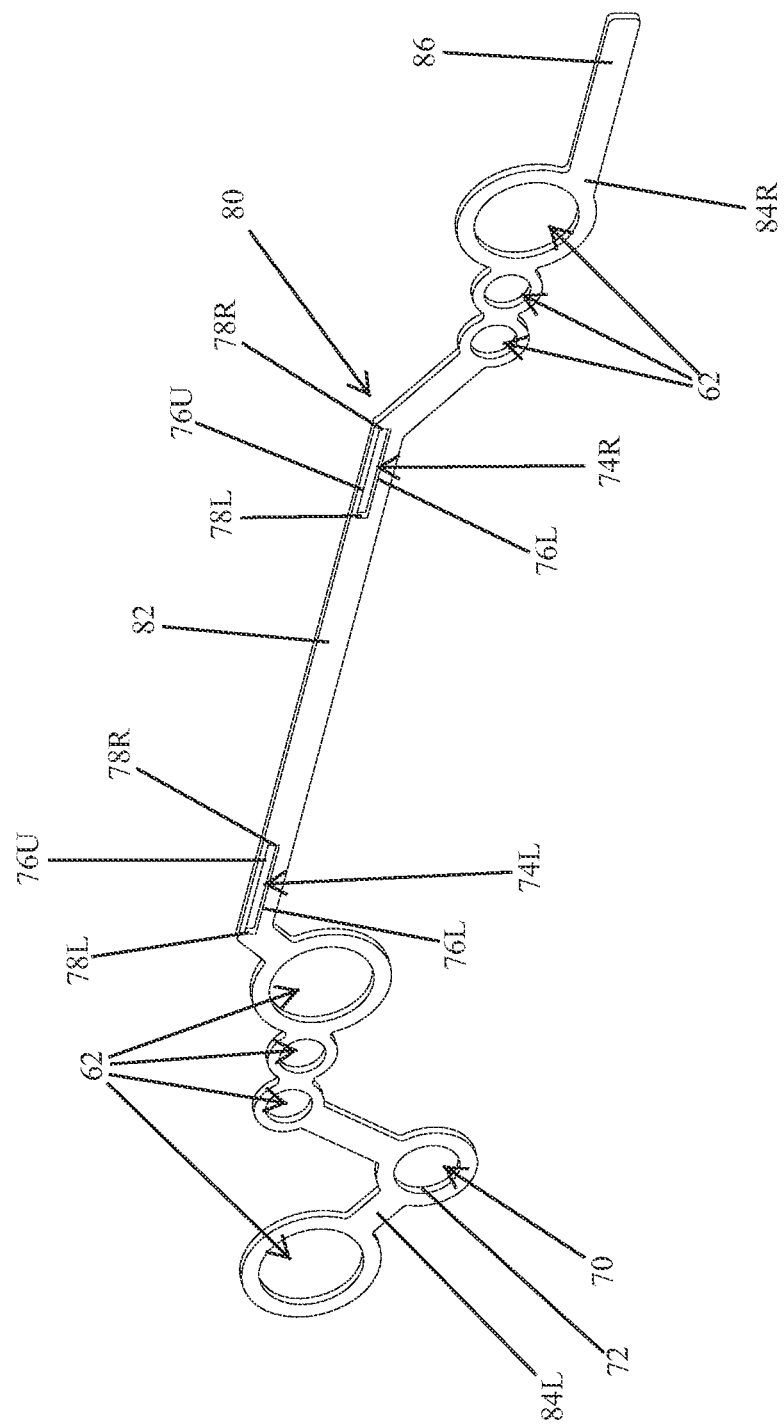

Referring now more particularly to FIGS. 7 and 8, another embodiment of a supporting bracket is shown and is designated by the numeral 80. Supporting brackets 80 are secured to the slider cross brace 15 and to a rotatable shaft 50 which is similarly vertically below the cross brace 15, but which is not centered between the side rails 14L, 14R. Rather, shaft 50 in this slider 10 is located adjacent the side rail 14R.

Supporting brackets 80 include a central portion 82 extending between the left and right rectangular openings 74L, 74R which are each similarly defined by elongate upper and lower walls 76U, 76L and left and right vertical walls 78L, 78R. A pair of left and right arms 84L, 84R extend from the central portion 80 in opposite directions. Left and right arms 84L, 84R are asymmetric/not mirror images of one another. A shaft receiving hole/bore 70 is located in one of the left or right arms 84L, 84R. In FIG. 8, the shaft receiving hole/bore 70 is provided in the left arm 84L. The hole/bore 70 is similarly defined by a cylindrical shaped wall 72 and is sized and adapted to receive the rod shaped rotatable shaft 50 therethough. The diameter/width of hole 70 is slightly larger than the diameter/width of the shaft 50 whereby the wall 72 thereof fits tightly therearound but does not interfere with the rotation thereof.

A plurality of tubes and wires supporting holes 62 are provide in the left and right arms 84L, 84R wherethrough the tubes and wires are received and are thereby supported. Plastic or rubber annular shaped grommets 64 can similarly be received in holes 62 for decreasing potential wear and/or damage to the tubes and wires 56 extending therethrough. An extension/finger 86 can also be provided as, for example, shown in right arm 84R which extends to and abuts the frame 12, whereby the bracket 80 can be further stabilized and/or supported.

Of course, in the brackets 80, as shown in FIGS. 7 and 8, the rectangular openings 74L, 74R are similarly both located in a horizontal plane which is distant from the shaft receiving hole 70, and both rectangular openings 74L, 74R and the hole 70 are located in a common vertical plane which is perpendicular to the horizontal plane. The supporting brackets 80 are also similarly secured to the slider 10 by extending the rotatable shaft 50 through the shaft receiving hole 70, one of the cross brace straps 15A, 15B through one of the left or right rectangular openings 74L, 74R, and the other cross brace strap 15A, 15B through the other left or right opening 74L, 74R. The brackets 80 are also spaced from the cross brace center 15C whereat the horizontal distance between the rectangular openings 74L, 74R corresponds with the horizontal distance between the cross brace straps 15A, 15B. Accordingly, the brackets 80 remain fixed and secure in the slider 10 in a vertical plane which is at a distance from the cross brace center 15C and perpendicular to rotatable shaft 50.

While this invention has been described as having an exemplary design, the present invention may be further modified within the spirit and scope of this disclosure. This application is therefore intended to cover any variations, uses, or adaptations of the invention using its general principles.

What is claimed is:

1. A trailer suspension including a tubes and wires support system comprising:
   a frame adapted to support a trailer;
   an axle secured to said frame;
   elongate cross brace straps secured to the frame and forming a cross brace with a cross brace center;
   a shaft mounted on said frame at a distance from said cross brace;
   a tubes and wires supporting bracket comprising a pair of strap openings and a shaft hole;
   wherein said supporting bracket is secured to said frame at a distance from the cross brace center with one of said straps extending through one of said bracket openings, the other one of said straps extending though the other one of said bracket openings and with the shaft extending through said bracket hole, whereby tubes and wires extending along said frame are supported by said bracket.

2. The trailer suspension of claim 1 wherein said supporting bracket includes a supporting hole wherethrough said tubes and wires are received and are thereby supported.

3. The trailer suspension of claim 2 further comprising an annular grommet circumscribing said bracket supporting hole wherethrough said tubes and wires are received and are thereby supported.

4. The trailer suspension of claim 1 wherein said supporting bracket includes a central portion and left and right arms extending in opposite directions, said bracket hole being located at said central portion, one of said bracket openings being located in said left arm, and the other of said bracket openings being located in said right arm.

5. The trailer suspension of claim 4 wherein a supporting hole is provided through one of said left or right arms wherethrough said tubes and wires are received and are thereby supported.

6. The trailer suspension of claim 1 wherein said cross brace straps are rectangular shaped in cross section and said bracket openings are rectangular shaped and sized to tightly fit around a strap.

7. The trailer suspension of claim 1 wherein said shaft is rod shaped and said bracket hole is cylindrical shaped and sized to tightly fit around but not interfere with rotation of said shaft.

8. The trailer suspension of claim 1 wherein said bracket openings and said bracket hole are coplanar.

9. The trailer suspension of claim 1 wherein said bracket openings are located in a first plane distant from said bracket hole, and said bracket hole and both of said bracket openings are located in a second plane which is perpendicular to said first plane.

10. The trailer suspension of claim 9 wherein said supporting bracket includes a central portion and left and right arms extending in opposite directions, said bracket hole being located at said central portion, one of said bracket openings being located in said left arm, and the other of said bracket openings being located in said right arm.

11. The trailer suspension of claim 10 wherein a supporting hole is provided through one of said left or right arms wherethrough said tubes and wires are received and are thereby supported.

12. The trailer suspension of claim 10 wherein said cross brace straps are rectangular shaped in cross section and said bracket openings are rectangular shaped and sized to tightly fit around a strap.

13. The trailer suspension of claim 10 wherein said shaft is rod shaped and said bracket hole is cylindrical shaped and sized to tightly fit around but not interfere with rotation of said shaft.

14. The trailer suspension of claim 1 wherein said frame is slidably coupled to a trailer chassis and is selectively longitudinally slidable along said chassis, wherein said frame further comprises a plurality of pins coupled to said shaft and wherein said shaft is selectively rotatable whereby said pins are selectively retracted for sliding said frame along said chassis and extended for fixing said frame to said chassis.

15. The trailer suspension of claim 14 wherein said supporting bracket includes a supporting hole wherethrough said tubes and wires are received and are thereby supported.

16. The trailer suspension of claim 14 wherein said supporting bracket includes a central portion and left and right arms extending in opposite directions, said bracket hole being located at said central portion, one of said bracket openings being located in said left arm, and the other of said bracket openings being located in said right arm.

17. The trailer suspension of claim 14 wherein said cross brace straps are rectangular shaped in cross section and said bracket openings are rectangular shaped and sized to tightly fit around a strap, and wherein said shaft is rod shaped and said bracket hole is cylindrical shaped and sized to tightly fit around but not interfere with rotation of said shaft.

18. The trailer suspension of claim 14 wherein said bracket openings are located in a first plane distant from said bracket hole, and said bracket hole and both said bracket openings are located in a second plane which is perpendicular to said first plane.

19. A trailer suspension including a tubes and wires support system comprising:
   a frame adapted to support a trailer;
   an axle secured to said frame;
   an elongate brace strap secured to the frame;
   a shaft mounted on said frame at a distance from said brace strap;
   a tubes and wires supporting bracket comprising a brace strap opening and a shaft hole;
   wherein said supporting bracket is secured to said frame with said brace strap extending through said bracket opening and with the shaft extending through said bracket hole; and,
   a supporting hole extending through said bracket wherethrough said tubes and wires are received and are thereby supported.

20. The trailer suspension of claim 19 wherein said brace strap is rectangular shaped in cross section and said bracket opening is rectangular shaped and sized to tightly fit around said brace strap, and wherein said shaft is rod shaped and said bracket hole is cylindrical shaped and sized to tightly fit around but not interfere with rotation of said shaft.

* * * * *